United States Patent [19]

Moscatelli

[11] 4,199,919

[45] Apr. 29, 1980

[54] APPARATUS FOR PRODUCING NEARLY PARALLELEPIPEDAL PACKAGING CONTAINERS

[75] Inventor: Silvano Moscatelli, Perugia, Italy

[73] Assignee: I.B.P. Industrie Buitoni Perugina S.p.A., Perugia, Italy

[21] Appl. No.: 855,454

[22] Filed: Nov. 28, 1977

[30] Foreign Application Priority Data

Dec. 2, 1976 [IT] Italy ............................. 52427 A/76

[51] Int. Cl.² .......................... B65B 9/08; B65B 9/12; B65B 51/30
[52] U.S. Cl. ...................................... 53/552; 53/373
[58] Field of Search ................ 53/373, 548, 550, 551, 53/552, 558, 459; 156/515, 582, 583

[56] References Cited

U.S. PATENT DOCUMENTS

| 3,334,466 | 8/1967 | Scholle | 53/459 X |
| 3,388,525 | 6/1968 | Thesing et al. | 53/182 X |
| 3,740,300 | 6/1973 | Heinzer | 156/583 |

FOREIGN PATENT DOCUMENTS 506545   5/1976   U.S.S.R. ............................. 53/182 M

Primary Examiner—Horace M. Culver
Attorney, Agent, or Firm—Cushman, Darby & Cushman

[57] ABSTRACT

The invention refers to an automatic apparatus for producing nearly parallelepipedal containers of flexible packaging material, particularly suitable for packaging liquids.

11 Claims, 11 Drawing Figures 4,199,919

APPARATUS FOR PRODUCING NEARLY PARALLELEPIPEDAL PACKAGING CONTAINERS

Packaging machines which produce packaging containers in the form of filled and sealed envelopes or bags from a continuous web of suitable heat-sealing sheet material which is transformed into a continuous hose, are already known. The basic steps carried out by said machines are: transversally heat-sealing said continuous hose, at intervals corresponding to the size of single containers to be produced, metering the feed of liquid to be packaged, forming the containers (i.e. transforming the hose into envelopes or bags) and severing the produced containers. The presence of intermittent or discontinuous movements is the most important limitation of packaging machines of the above mentioned type. It is clear that said machines and generally the mechanical devices operating in them cannot be used in systems with higher packaging speeds. Particularly if the basic operations of sealing, shaping and severing of single containers are carried out with a sequence of steps to be performed at separated stations, also considerable problems of synchronisation and therefore of structural complication are caused. The most important consequence thereof is that it is impossible to reduce the length of some operating steps below a given limit.

Therefore, it is the object of the present invention to obviate the above-mentioned drawbacks and limitations of the prior art.

The apparatus according to the invention consists of a system with continuous motion eliminating idle times of the intermittent or discontinuous movements. It allows nearly parallelepipedal packaging containers to be produced, in an automatic and continuous way and with a high packaging speed.

The apparatus according to the invention is a structurally and functionally simple and compact system; it consists of two substantially equal and symmetrical opposed assemblies of jaws, engaging between them a length of the packaging material hose; each assembly comprises actuating and guiding means for setting and constantly keeping said jaws in a purely translational continuous motion, which maintains them always parallel to themselves, in particular horizontal, and with the jaws of the first assembly being perfectly opposed to the corresponding jaws of the second assembly; there is no relative rotation of the real sealing member and of its bearing; the jaws in the operative stage engage the packaging material hose without applying any harmful stress to the hose and to the container being shaped. Each jaw supports operative packaging means for carrying out in a single operating step or station all the packaging operations of containers, i.e. transversally sealing said hose, metering the feed of product to be packaged within the containers, shaping each container into a nearly parallelepipedal form, and severing every two consecutive containers.

Said actuating and guiding means essentially consist, for each assembly, of two rotating parallel disks, whose axes of rotation present a misalignment, each jaw being pivoted to said disks at two points of the jaw which present the same misalignment as said rotating disks, so that for each jaw a kinematic motion like that of an articulated parallelogram is obtained.

According to a first embodiment of the invention, said operative packaging means are arranged in an outer position with respect to said two rotating disks, said two pivot points of the jaw lying then at a side end of the jaw, and its other side end being pivoted in a third rotating disk, parallel and coaxial to the one of the other two disks, which is the nearest to said third disk.

According to another embodiment of the invention, said operative packaging means are arranged in an inner position with respect to the two rotating disks, said two pivot points of the jaw lying then at the two side ends of the jaw.

The packaging means for carrying out the transversal sealing step consist, for each jaw, of a sealing member reciprocating with respect to a jaw portion which forms a support; during the operative stage in which a jaw of the first assembly and the corresponding jaw of the second assembly are engaged with each other, such jaws collectively move with a rectilinear motion, in particular with a vertical motion. Moreover, in order to guarantee the required sealing pressure during the operative stage, spring and cam means are provided.

The metering and shaping means carried by each jaw consist of members which are stationary or partially stationary and partially movable with respect to the jaw, as well as of surfaces of the sealing members, which through the cooperation of some corresponding jaws of the two assemblies carry out the automatic liquid metering and the automatic shaping of a container nearly into the form of a parallelepiped with four triangular end flaps.

These and other features of the apparatus according to the invention will result more clearly from the following description of two exemplifying and not limiting embodiments thereof, taken in conjunction with the appended drawings, in which.

Figure 1:
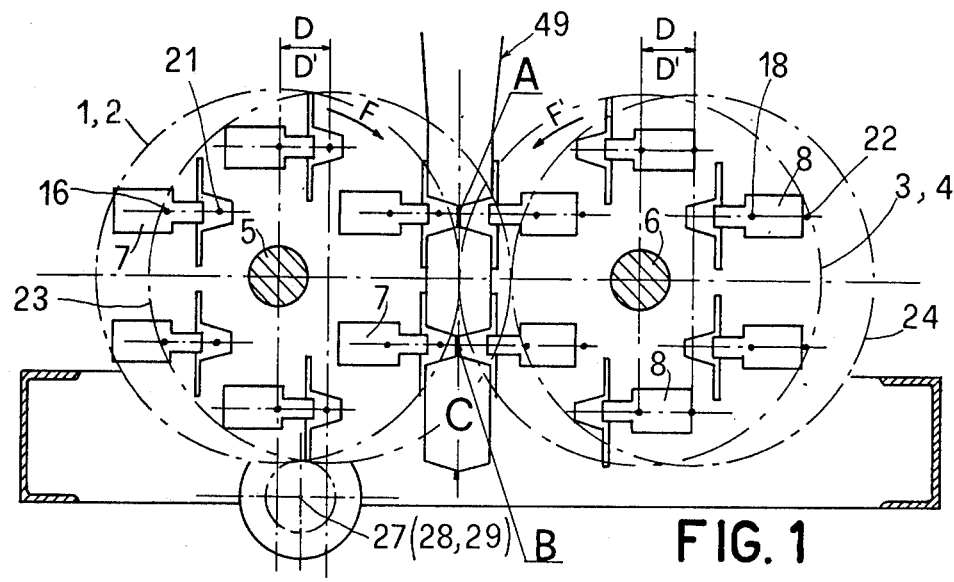
FIG. 1 is a schematic side view, with some parts removed, of a first embodiment of the apparatus according to the invention.
Figure 2:
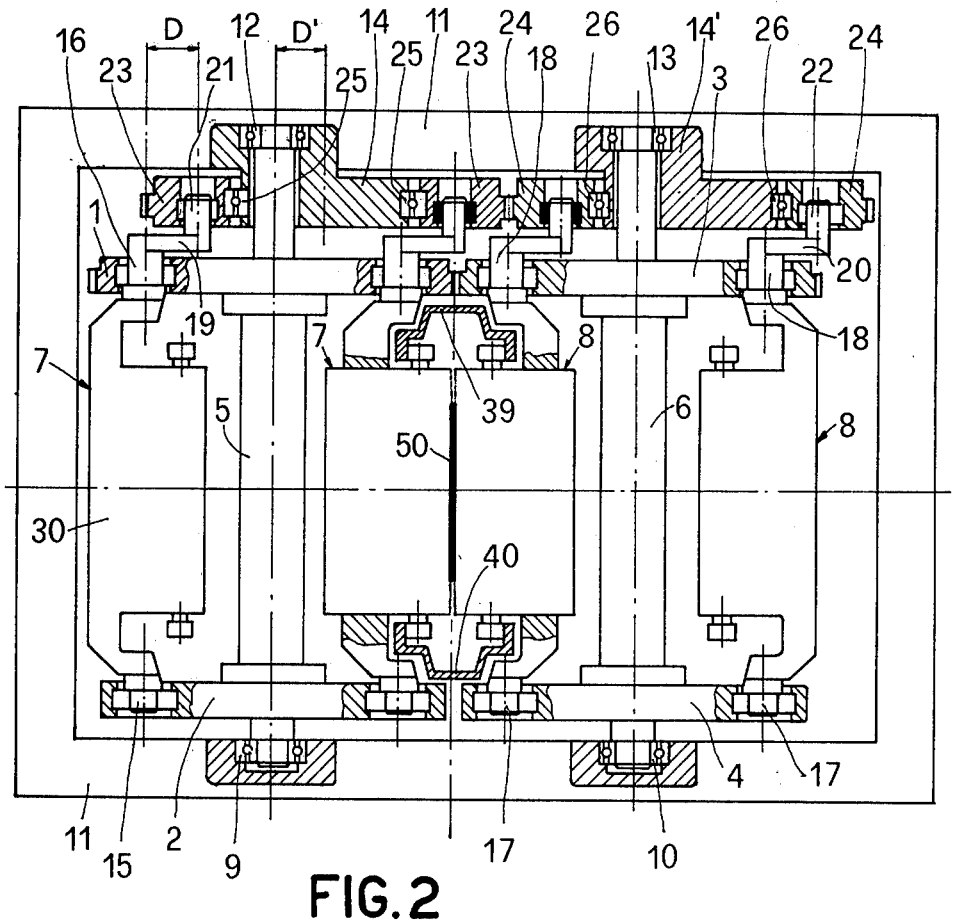
FIG. 2 is a schematic axial horizontal sectional view, with some parts removed, of the apparatus of FIG. 1.
Figure 3:
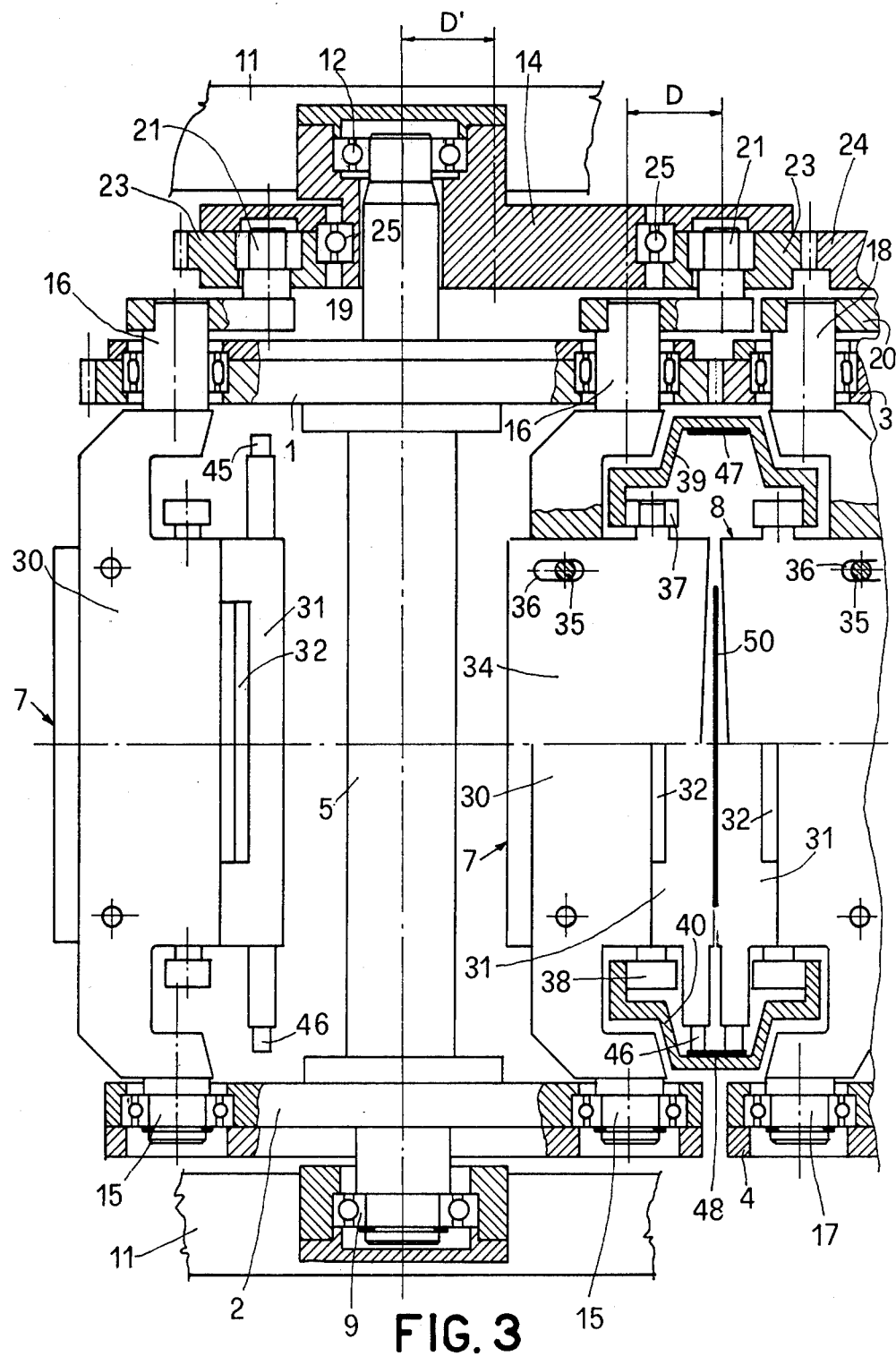
FIG. 3 is a view similar to that of FIG. 2, showing a part of FIG. 2 in an enlarged scale and in a greater detail.

With reference at first to the embodiment shown in FIGS. 1–5, the apparatus according to the invention comprises two pairs of parallel disks 1, 2 and 3, 4, respectively, which are vertically arranged and are bodily connected two by two by means of two horizontal parallel axles 5 and 6 respectively. Between said disks of each pair, jaws 7 and 8 are fitted so as to be angularly equidistant along the circumference; in this embodiment the jaws are six for the disks 1, 2, and also six and symmetrically arranged for the disks 3, 4.

The whole therefore forms a structure with two assemblies (one on the left and the other on the right with respect to the figures), which are substantially equal and symmetrical, and reciprocally engaged as it will be better explained hereinafter.

Said axles 5, 6 are each pivoted in bearings 9, 10 carried by the fixed apparatus casing 11, and in bearings 12, 13 carried by two fixed rings 14 and 14' respectively, fastened to the casing 11. The jaws 7, 8 are in turn freely mounted through their journals 15, 16 and 17, 18 respectively, in suitable bearings carried by the respective disks 1, 2 and 3, 4.

Each journal 16 and 18, outside the respective disk 1 and 3, is integral with an arm 19 and 20 respectively (inverted with respect to the arm 19 in relation to the jaw); the journals 21, 22 of these arms 19, 20 are freely mounted on gear disks or rings 23, 24, which rotate about said fixed rings 14, 14' through bearings 25, 26.

It is to be noted that the distance D between said journals 16 and 21 (or 18 and 22) is the same as the misalignment D' between the disk 1 and the ring 23 (or between the disk 3 and the ring 24).

Whereas the disks 2 and 4 are not gear disks and are not engaged with each other, the disks 1 and 2 are mutually engaged gear disks as shown.

Figure 4:
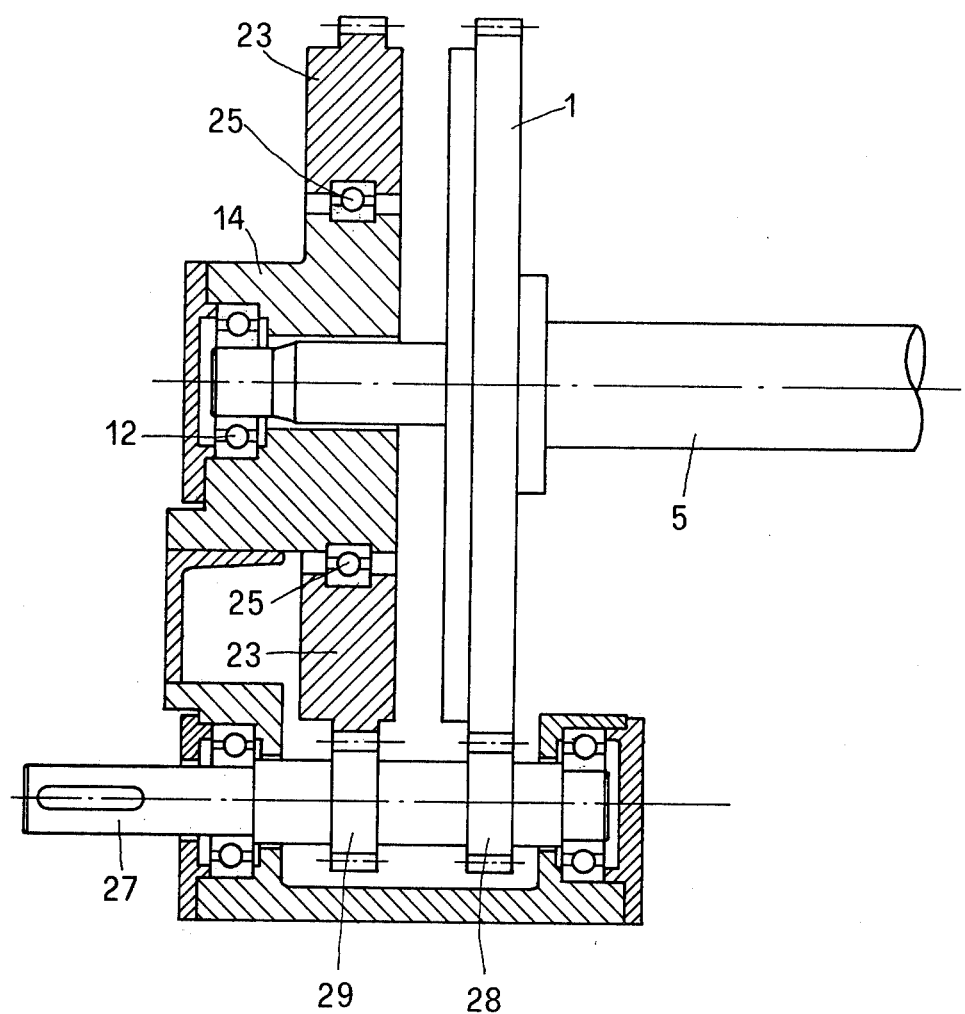
FIG. 4 is an elevational view from the left of FIG. 1, with some parts removed and some parts cut away.

The operation of the illustrated structure is carried out by the driving shaft 27 of the apparatus through two pinions 28, 29 carried by said shaft and engaged with the gear disk 1 and the gear ring 23 respectively (see particularly FIGS. 1 and 4). Through the axle 5 the rotation is transmitted to the disk 2; the right assembly in turn is caused to rotate through meshing of the disk 1 and the ring 23 with the disk 3 and the ring 24 respectively; the axle 6 transmits in turn the rotation to the disk 4. The assembly of members 27, 28, 29, 1, 2, 3, 4, 23 and 24 forms a particularly compact and rigid driving unit.

By virtue of the illustrated kinematic system, wherein the jaws 7 and 8 are mounted like an articulated parallelogram, according to the invention said jaws are constantly kept in a purely translational motion and therefore always parallel to themselves.

Each jaw 7 or 8 comprises a support 30, a sealing and shaping member 31, metering and shaping plate members 32, 33, integral with the member 31, and a cutting member 34. The sealing member 31 is spring mounted in the support 30 by means of a compression spring 34', so as to be horizontally sliding. Also the cutting member 34 is spring mounted (and normally kept in the position shown in FIG. 3) so as to be sliding within the support 30 and through the sealing member 31, the member 34 being guided by the engagement of pins 35 (integral with the support 30) and slots made in the member 34. The cutting edge of the member 34 is V-shaped, like a guillotine. The member 34 is provided with two rotating rollers 37 and 38, which may engage the fixed vertical cam tracks 39 and 40. The sealing elements are formed by two laminar L-shaped laminar bodies 41 and 42, fastened to the sealing member 31 by means of plates 43, 44. The electric pulse to carry out the sealing is taken through engagement between sliding contacts 45, 46 (carried by the member 31) and plates 47, 48 fixed on the cams 39, 40; of course the member 31 and the plates 43, 44 are electrically insulated at the surfaces of the laminar bodies 41, 42.

The operation of the above described apparatus is now the following. A hose 49 of packaging material, produced in previous steps of the packaging cycle, is vertically fed to the apparatus in a continuous way, as schematically shown in FIG. 1, while the left and right assemblies of the apparatus are rotating in an uniform and continuous way according to the arrows F, F', and the two groups of jaws 7, 8 are constantly moving, as above mentioned, in a purely translational motion. The hose is therefore engaged between a jaw 7 and the corresponding jaw 8, which come to mutual contact through their members 31 at the point A. The contact between two corresponding jaws finishes at the point B; beyond this point they begin to move away one from the other, while the two following upper jaws are already engaged so as to avoid any stress by the liquid column within the hose against the transversal sealing.

Figure 5:
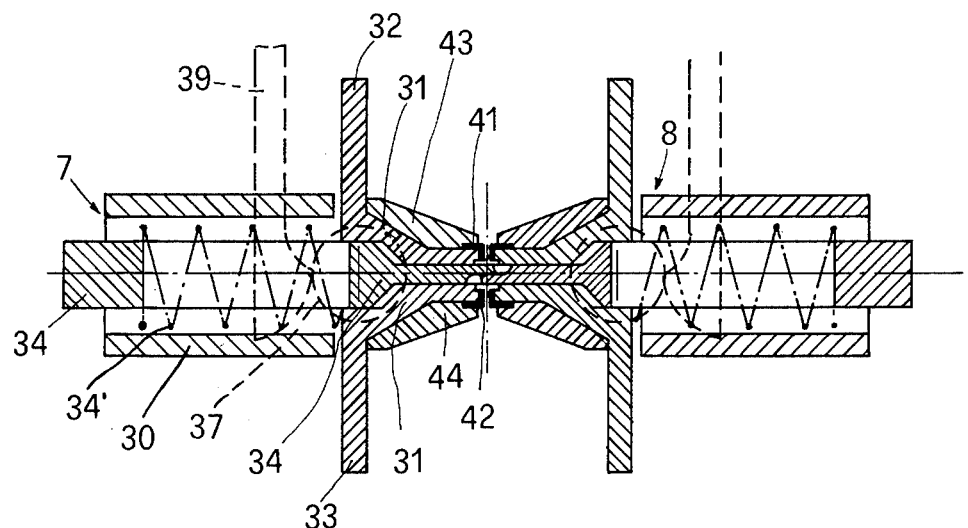
FIG. 5 is a schematic vertical sectional view of some members of the apparatus of preceding Figures.
Figure 10:
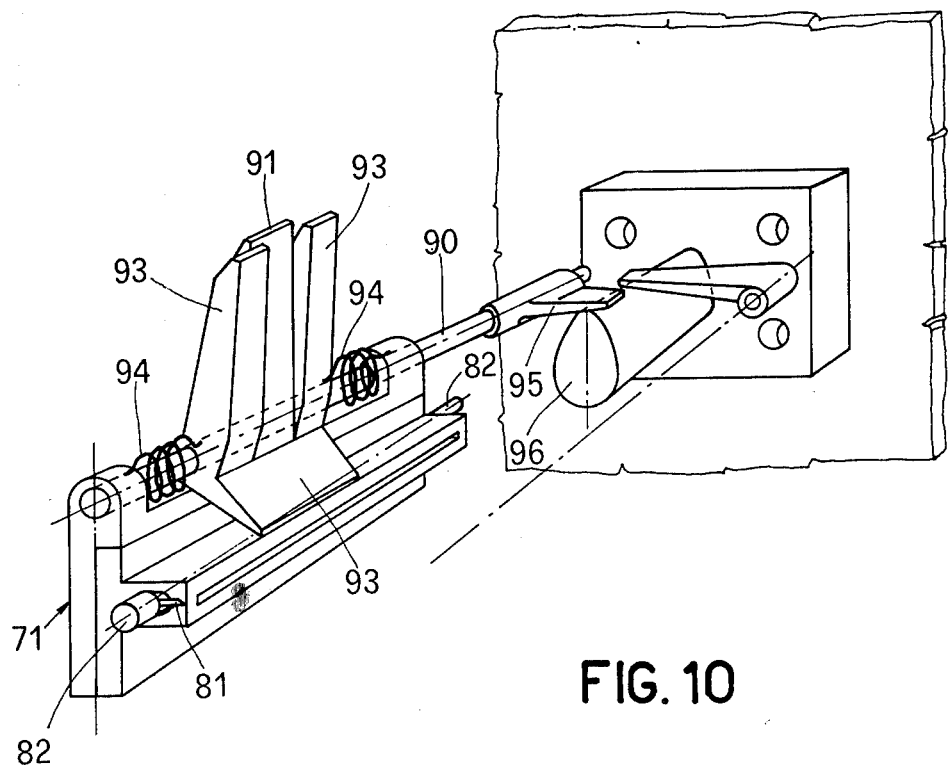
FIG. 10 is a perspective view of some members of the apparatus of FIGS. 6–9.
Figure 6:
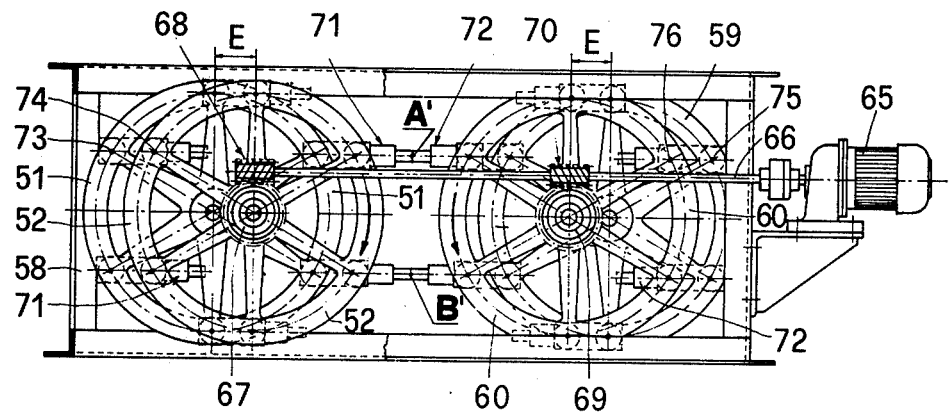
FIG. 6 is a schematic side view, with some parts removed, of a second embodiment of the apparatus according to the invention.

Therefore the jaws carry out, through the laminar bodies 41 and 42, the transversal thermosealing onto the flattened hose 50, this operation beginning at the point A and ending at an intermediate point between A and B, as determined by the length of the sealing time. Severing of the hose in single packaging units C, through the above described members 34, 37, 38, 39 and 40 in the arrangement of FIG. 5, is carried out just before the beginning of the jaw separation at the position B; therefore, at the moment of cutting, the sealing bead is suitably cooled and consequently solid and, as the members 34 are set in action while the jaws are still in a pressure condition, a perfect horizontal cut, centered in respect to the transversal sealing strip, is assured.

Of course, during the run A-B, feeding of the product to be packaged within the container is carried out.

From the above it is clear that each jaw 7 and each corresponding jaw 8 with their purely translational motion always move, approach and engage in a perfect opposition and are also kept in this perfect opposition during all the contact time A-B, since they are being naturally moved so as to be always normal to vertical symmetry plane of the packaging material hose. In the length A-B the two jaws move with a vertical rectilinear motion, by virtue of the above illustrated sliding assembly of the members 31 with respect to the supports 30, said assembly between 31 and 34 also assuring through 37, 38, 39, 40 the required transversal sealing pressure on the hose.

The descending vertical motion of each pair of jaws engaging the hose is characterized by an average value of translation speed lower than the feeding speed of the hose 49, with consequent accumulation of packaging material over each pair of engaged jaws.

The combined effect of mutual approaching of the two pairs of jaws engaging the hose (this approaching naturally resulting from the particular kinematic motion in question), of metering and shaping action of the members 32, 33 and 31 with the relevant plates 43, 44 of the jaws in an operative condition, of the aforesaid packaging material accumulation and of pre-existent scoring lines on the hose 49, causes said hose to be transformed in a continuous, quick and automatic manner into a series of filled and sealed containers, which are detached the one from the other and already nearly parallelepiped-shaped with relative four triangular end flaps.

It is evident that, by changing the shape of the plates 43 and 44, it will be possible to obtain shaped containers with lower and upper surfaces which are squared and flattened.

Turning now to the embodiment of the present invention according to FIGS. 6 to 11, also in this case the apparatus consists of two assemblies (one left assembly and one right assembly) which are substantially equal and symmetrical and reciprocally engaged as it will be explained hereinafter.

The left assembly comprises two parallel, vertically disposed disks 51 and 52, whose journals 53 and 54 respectively are secured to their disks and are pivoted with a misalignment E in a fixed cranked arm 55, arranged between them, on one hand, and in bearings 56 and 57, fastened to the casing 58 of the apparatus, on the other hand.

Figure 7:
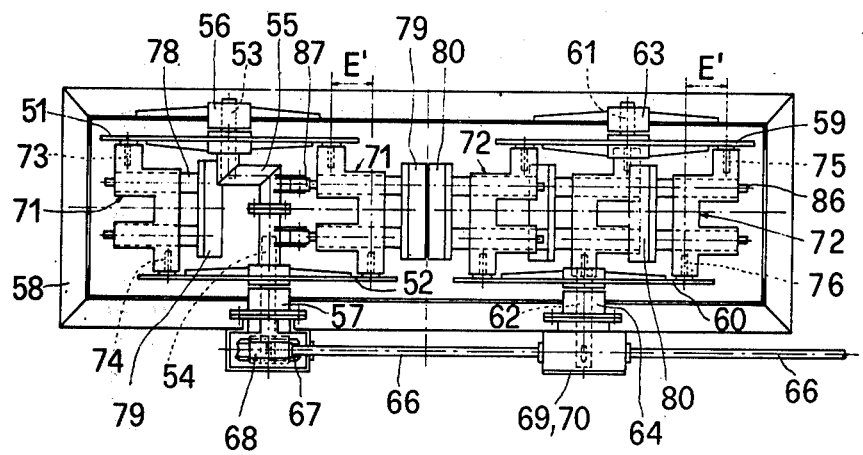
FIG. 7 is a schematic plan top view, with some parts removed, of the apparatus of FIG. 6.
Figure 8:
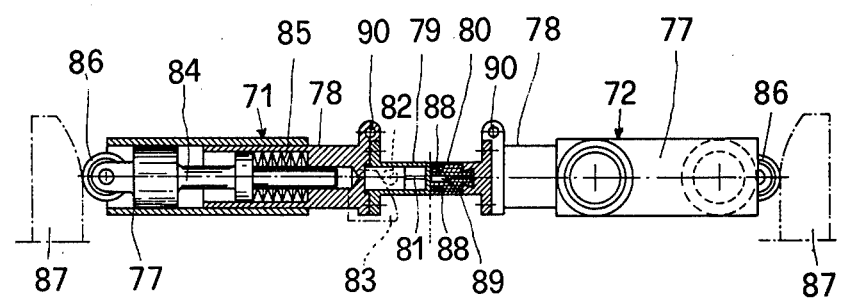
FIG. 8 is a schematic vertical view, with some parts cut away, of some members of the apparatus of FIGS. 6 and 7.
Figure 9:
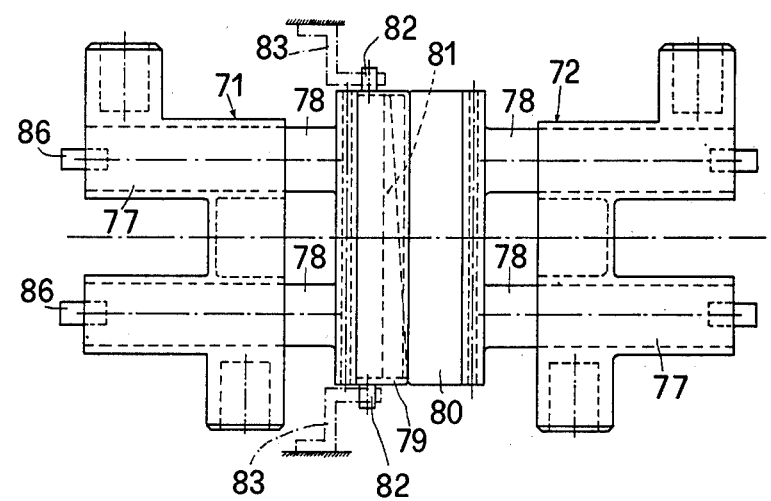
FIG. 9 is a plant view of FIG. 8.

The corresponding members of the right assembly are designated with the references 59 to 64 (the member corresponding to the arm 55 is not shown in the right assembly of FIG. 7).

The rotation drive of said two assemblies is carried out by means of an electric motor 65, the shaft 56 of which causes said journals 54 and 62 to rotate through two helical gear-worm screw connections 67, 68 and 69, 70 respectively. Between said disks 51, 52 and 59, 60 respectively, six jaws 71 and 72 respectively are mounted; each jaw 71 is freely mounted on two pins 73 and 74, carried by the disks 51 and 52 respectively; each jaw 72 is in the same way mounted on two pins 75 and 76 carried by the disks 59 and 60 respectively. The pins 73, 74 and 75, 76 have a misalignment E' identical with the aforesaid misalignment E.

It is clear that also in this embodiment, the jaws 71 and 72 are mounted like an articulated parallelogram, and therefore they constantly achieve a purely translational motion which always keeps them perfectly parallel to themselves.

Each jaw comprises an enbloc support 77 in which within circular seats two cylindrical pins 78 are sliding. The pins 78 of the jaw 71 carry a sealing pressure, cutting and shaping member 79, whereas the pins 78 of the jaw 72 carry a sealing and shaping member 80. Within the member 79 a guillotine-shaped cutting blade 81 is housed and retained by elastic means not shown, said blade being provided with two little pins or rollers 82 which may be engaged by two corresponding fixed cam sections 83.

Within the support 77 and the pin 78 a little piston 84 is housed, which is spring engaged with the pin 78 through cup springs 85 and carries at its outer end a sliding roller 86, which may engage a fixed cam section 87. The member 80 is in turn provided with two thermosealing elements 88 and with an interposed seat 89 apt to receive the cutting blade 81.

Each jaw 71 and 72 moreover carries on a pin 90 a fixed upright metering and shaping plate 91 (fastened to the jaw by means of a bracket 92), as well as a metering and shaping square 93, presenting one lower arm and two upper arms between which the plate 91 is inserted. The square 93 may rotate together with the pin 90 and is constrained to the jaw through two torsion springs 94.

The plates 91 and the squares 93 of each pair of mutually engaged jaws 71 and 72 define a well determined volume for metering the feed of product to be packaged within the container and for shaping the container; by merely changing the shape and/or the mounting position of said plates and squares, said volume will be easily adjustable and adaptable to every operating requirement.

To each pin 90 a tongue 25 is fastened which may be engaged by a cam 96 carried by the apparatus casing.

The operation of this embodiment of the apparatus according to the invention is now the following.

Figure 11:
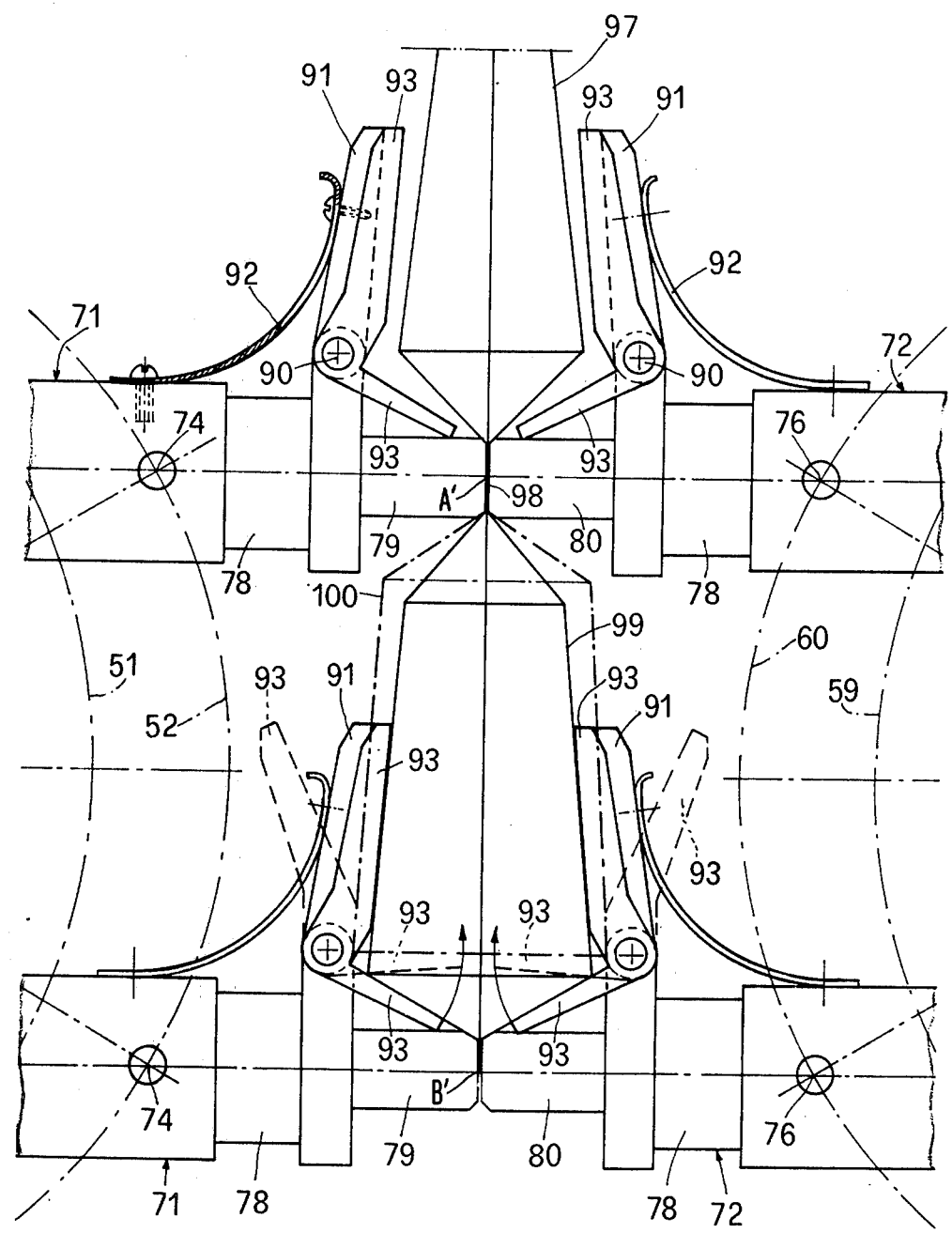
FIG. 11 is a schematic vertical view showing the operation of said second embodiment of the invention.

A packaging material hose 97, produced in other packaging cycle steps, is continuously fed to this apparatus as schematically shown in FIG. 11. As soon as two corresponding jaws 71 and 72 come in contact with the hose, they begin to deform it and at the position A' the operation of transversal thermosealing of the flattened hose 98 starts, this sealing operating ending at an intermediate position between point A' and point B'; at this last position the engagement of the two jaws is ended.

As above mentioned, all the jaws constantly move with a purely translational motion and with a perfect mutual opposition, and particularly in all the contact length A'-B' (by sliding between the members 77 and 78) they are in vertical rectilinear motion while a perfect mutual opposition is always kept. The packaging material hose is fed with an average speed higher than that of the jaws engaging the hose, hence there is an accumulation of packaging material over each pair of jaws in an operative condition. During the run A'-B', also the feeding of product to be packaged within the container is carried out.

Just before the two engaged jaws begin to move away (at the point B'), the following upper jaw pair comes to engagement (at the point A').

When two jaws come to mutual contact at the initial point A', engagement of the members 86 and 87 compels the pistons 84 to compress the cup springs 85, producing the required pressure for sealing the packaging material hose. This pressure is kept constant during all the contact A'-B', and that improves the sealing result. It is clear that, by changing the vertical position of the cam sections 87, it is possible to shift the end contact points A' and B'.

The cutting of the transversal sealing bead is performed at a position near to the end contact point B' through cooperation of said members 82 and 83.

At the moment in which the two upper jaws join, metering of product to be packaged is defined and the container is shaped as shown in FIG. 11 with the continuous line 99; at the bottom and the sides the container is lying on said lower and upper arms of the squares 93, respectively. At the moment in which the two lower jaws begin to move away one from the other, engagement of said members 95 and 96 causes the squares 93 to rotate according to the arrows shown in FIG. 11, said squares coming to the position shown in dashed line in FIG. 11. Therefore, while the two lower jaws progressively move away one from the other, the container is in practice pushed from below against the pair of upper engaged jaws; the effect of this upward push and the simultaneous relative approaching of the two jaw pairs (naturally caused by the illustrated kinematic motion) before the moving away of the two lower jaws becomes equal to the minimum bottom size of the container, cause a packaging container to be actually formed with its ultimate dimensions and with its four triangular end flaps, disposed perpendicularly to the drawing plane of FIG. 11. This is naturally allowed by the above-mentioned accumulation of packaging material (determined by the difference between said two speeds) and is aided by pre-existent scoring lines on the hose.

Therefore the packaging container in this shaping stage passes through the shape indicated by the chain outline 100, so being supported at the bottom and the sides by said lower arms of the squares 93 and said fixed plates 91 respectively.

In conclusion, the cooperation of said members 79, 80, 91 and 93 of two pairs of operative jaws causes a finished, nearly parallelepipedal container to be formed, having its lower surface perfectly squared up by the lower arms of the squares 93 of the two lower jaws and its upper surface nearly squared up by pressing against the members 79 and 80 of the upper jaw pair.

Therefore it was shown that the motion of the jaws of the apparatus according to the invention is continuous as well as purely translational and each of them presents all the members needed for carrying out the full transformation cycle of a hose into single nearly parallelepipedal containers. So the invention makes it possible in an automatic and continuous way, with the highest operative speed, in a combined manner at one station and with the best and most protective engagement of the packaging material hose, to carry out sealing, metering, shaping and severing of single containers.

It is obvious that many variants and modifications may be applied by the skilled in the art to the above illustrated exemplificative forms of embodiment of the present invention, without departing from its spirit; it is understood that all these variants and modifications fall within the scope of the present invention.

What is claimed is:

1. An apparatus for producing nearly parallelepipedal packaging containers, from a continuous hose of flexible packaging material, comprising two substantially equal and symmetrically opposed assemblies of jaws, mounted to engage between them a length of said hose and to maintain a purely translational continuous motion, said apparatus comprising: actuating and guiding means for said jaws, including for each assembly two rotating parallel disks having axes of rotation and transversely distanced fixed bearings mounting said disks for rotation about their axes, each jaw being pivoted on said disks at two points of the jaw which are at the same transverse distance as the rotating disks, to provide for each jaw a kinematic motion like that of an articulated parallelogram; said jaw having a portion forming a support, sealing means supported by each jaw, comprising a sealing member adapted to reciprocate with respect to said jaw portion forming a support; metering and shaping means supported by each jaw, comprising fixed plate means, pivoting square means and surfaces of said sealing means, said metering and shaping means only defining portions of only two sides of the container to be formed; and severing means, supported by each jaw, comprising blade means adapted to slide through said sealing means.

2. An apparatus according to claim 1, characterized in that in each jaw said sealing means, said metering and shaping means and said severing means are arranged in an outer position with respect to said two rotating disks, said two pivot points of the jaw lying at a side end of the jaw and its other side end being pivoted in a third rotating disk which is parallel and coaxial to the one of the other two disks which is the nearest to said third disk.

3. An apparatus according to claim 1, characterized in that said sealing means, said metering and shaping means and said severing means are arranged in an inner position with respect to said two rotating disks, said two pivot points of the jaw lying at the two side ends of the jaw.

4. An apparatus according to claim 1 wherein said two rotating disks having said transverse distancing are in each assembly gear disks meshing with the corresponding gear disks of the other assembly, the apparatus further comprising a driving shaft carrying two pinions which respectively mesh with the gear disks of one of the two assemblies.

5. An apparatus according to claim 1 including a driving shaft which, by means of two separate helical gear-worm screw connections, causes the journal of a disk of the first assembly and the journal of the coplanar disk of the second assembly to rotate.

6. An apparatus according to claim 1 wherein said severing means comprises a blade sliding through the sealing member of the first assembly jaw, and an analogous counter-blade or a receiving seat for said blade, in the sealing member of the second assembly jaw, said blade and counter-blade being driven to cut the transversal sealing bead by cooperation of rollers carried by them and cams fastened to the apparatus casing.

7. An apparatus according to claim 1 wherein said metering and shaping means include a fixed upright plate extending upwards from the sealing means and a square fixed to a pin carried by the upper part of said sealing means and pivoting, against return spring means, by action of a fixed cam, fastened to the apparatus casing, the shaping means further comprising the lower surface of said sealing means, so that the metering and shaping are performed at the beginning by engagement of the bottom and sides of the container being shaped, with the lower and upper arms, respectively, of the squares of two engaged jaws, and subsequently the shaping into a nearly parallelepipedal form is performed by push of the rotating lower arms of these squares against the container bottom and by engagement of the container sides with said fixed upright plates of the same jaws, the container top being pressed against said lower surface of the sealing means of two following engaged jaws.

8. An apparatus according to claim 1, wherein said metering and shaping means comprise upper and lower surfaces of said sealing means and fixed plate members extending up and down from said sealing means.

9. Apparatus as in claim 1 wherein said sealing member is elastically connected with said severing means, said apparatus including fixed cam means for moving said severing means and for then keeping them stationary, with a resulting constant pressure from said sealing member.

10. Apparatus as in claim 1 wherein said sealing member is elastically connected with a piston housed in said support, said piston being provided with a roller engaging with fixed cam means which move said piston and then keep it stationary, with a resulting constant pressure from said sealing member.

11. In apparatus for producing nearly parallelepipedal packaging containers from a continuous hose of flexible packaging material, said apparatus being of the type having at least one pair of substantially equal symmetrically opposed jaws which engage between them a length of hose in a manner to effect formation of a parallelepipedal package containing a product, the improved construction for actuating and guiding each jaw comprising two rotatable members disposed in spaced-apart parallel planes; means mounting said members for rotation in said parallel planes about spaced-apart axes which extend at right angles to said planes; and means pivotally mounting the respective jaw to each rotatable member for rotation about two separate pivot axes parallel to the rotation axes of said rotatable members, the pivot axes of said jaw being spaced apart by a distance equal to the spacing between said rotation axes of said members, whereby upon rotation of said rotatable members the respective jaw shows a kinematic motion like that of an articulated parallelogram.

* * * * *

UNITED STATES PATENT AND TRADEMARK OFFICE
Certificate

Patent No. 4,199,919            Patented April 29, 1980

Silvano Moscatelli

Application having been made by Silvano Moscatelli, the inventor named in the patent above-identified, and International Paper Co., the assignee, for the issuance of a certificate under the provisions of Title 35, Section 256, of the United States Code, adding the name of Mario Pinchi as a joint inventor, and a showing and proof of facts satisfying the requirements of the said section having been submitted, it is this 21st day of Feb., 1984, certified that the name of the said Mario Pinchi is hereby added to the said patent as a joint inventor with the said Silvano Moscatelli.

Fred W. Sherling,
*Associate Solicitor.*